United States Patent [19]
Chan

[11] Patent Number: 5,491,768
[45] Date of Patent: Feb. 13, 1996

[54] OPTICAL WAVEGUIDE EMPLOYING MODIFIED GALLIUM ARSENIDE

[75] Inventor: Kam T. Chan, Windsor, Calif.

[73] Assignee: The Chinese University of Hong Kong, Hong Kong, Hong Kong

[21] Appl. No.: 281,386

[22] Filed: Jul. 27, 1994

[51] Int. Cl.$^6$ ............................................. G02B 6/134
[52] U.S. Cl. .................. 385/132; 385/9; 385/39; 385/141; 437/25; 437/27; 437/247
[58] Field of Search .................... 385/14, 16, 18, 385/129–132, 141, 142, 4, 8, 9, 39, 40, 41; 372/43, 44, 50; 257/12, 21, 183, 184, 617, 432; 437/16, 20, 24, 25, 27, 47, 247, 934

[56] References Cited

U.S. PATENT DOCUMENTS

| | | | |
|---|---|---|---|
| 4,162,460 | 7/1979 | Gonda | 372/43 |
| 4,166,669 | 9/1979 | Leonberger et al. | 385/132 |
| 4,439,004 | 3/1984 | Hunsperger et al. | 385/132 |
| 4,677,740 | 7/1987 | Shifrin et al. | 437/24 |
| 4,784,451 | 11/1988 | Nakamura et al. | 385/18 |
| 5,107,538 | 4/1992 | Benton et al. | 385/130 |
| 5,329,137 | 7/1994 | Taylor et al. | 257/21 |

OTHER PUBLICATIONS

Chan et al. "Modification of Refractive Index of GaAs by Ion Implantation of Oxygen," *Nuclear Instruments and Methods in Physics Research, Sect. B,* (NIM B), vol. 83, No. 1 pp. 177–180 (2 Oct. 1993), North–Holland (Elesvier Science Publishers, B.V., Amsterdam).

*Primary Examiner*—John D. Lee
*Attorney, Agent, or Firm*—Townsend and Townsend and Crew; Kenneth R. Allen

[57] ABSTRACT

In an optical waveguide fabrication process, medium weight, relatively stable ions, such as oxygen ions, are implanted, preferably in a multiple-step, multiple-energy level process, into GaAs, InP or other like III-V materials and heterostructures and then annealed by radiant heat, in order to produce a structure with an elevated index of refraction without restriction on the carrier concentration or resistivity of the stock wafer by the presumed generation of stable crystalline defects in the implanted region. The ions used for implantation should not generate free carriers once implanted.

22 Claims, 3 Drawing Sheets

OPTICAL WAVEGUIDE EMPLOYING MODIFIED GALLIUM ARSENIDE

BACKGROUND OF THE INVENTION

This invention relates to solid state optical waveguides, and more particularly to a waveguide construction in III-V semiconductor material.

Gallium arsenide (GaAs) and indium phosphide (InP) represent two types of semiconducting materials widely used as substrate materials for the fabrication of microwave, high-speed and optoelectronic devices and circuits. Optoelectronic devices such as lasers and detectors are fabricated on heterostructures grown epitaxially on GaAs and InP substrates. Although many of these optical devices can be fabricated on the same wafer (chip), it remains very difficult to connect them together in the same way as one can with electronic devices in silicon integrated circuits.

It is known to use optical connecting paths in the form of waveguides to transport optical signals from one place to another on the chip. However, the fabrication of optical waveguides usually requires an etching process that generates step heights on the order of a micrometer (μm) on the chip surface. Not only is this process difficult to control, but also the resulting steps on the wafer surface present a major obstacle to integrate optical devices monolithically as further lithographic processes to be performed on the uneven wafer surface are difficult to control accurately.

One prior technique to circumvent the step height problem in the fabrication of optical waveguides has involved the implantation of protons into GaAs. The method works by reducing the carrier concentration in the implanted region, thereby increasing its refractive index and hence creating a waveguide structure. However, this technique suffers from two major drawbacks: (1) the substrate to be implanted into has to have a large carrier concentration so that after the implantation, the implanted region can experience a major reduction of carriers in order to result in a sufficient increase of refractive index above that of its surroundings, and (2) the implanted protons tend to diffuse to neighboring regions when the wafer is heated to moderate temperatures, thus undoing the effects of implantation in the intended locations.

What is needed is a mechanism for minimizing the drawbacks of prior techniques while addressing the step height problem.

A precursor to the present invention was described in a paper authored by the inventor and assisted by Y. W. Hui, D. J. Han, and G. H. Li entitled: "Modification of Refractive Index of GaAs by Ion Implantation of Oxygen," Nuclear *Instruments and Methods in Physics Research, Sect. B*, (NIM B), Vol. 83, pp. 177–180 (1993), North-Holland (Elesvier Science Publishers, B.V., Amsterdam). The content of the article is incorporated herein by reference and made a part hereof. The article did not explore the details of the implantation, the doses or the annealing process.

SUMMARY OF THE INVENTION

According to the invention, in an optical waveguide fabrication process, medium weight, relatively stable ions, such as oxygen ions, are implanted, preferably in a multiple-step, multiple-energy level process, into GaAs, InP or other like III-V materials and heterostructures and then annealed by radiant heat, in order to produce a structure with an elevated index of refraction without restriction on the carrier concentration or resistivity of the stock wafer by the presumed generation of stable crystalline defects in the implanted region. (Thus, the stock or starting wafer can be conducting as well as semi-insulating and need not be a dielectric.) Such defects absorb light and, according to Kramers-Kronig relationships, the presence of light absorption is accompanied by an increase in refractive index. Annealing minimizes light absorption with the increased refractive index. The ions used for implantation should not generate free carriers once implanted.

A structure so formed has many advantages over conventional proton implantation in III-V material. First, the refractive index in the implanted region will increase no matter what the substrate material is or what type of resistivity it initially possesses. Furthermore, oxygen ions are very stable once implanted into the semiconductors and will not diffuse out even when the wafer is heated to high temperatures, as in annealing. This ensures that the optical waveguide created will remain intact even when the wafer is subjected to further semiconductor processing steps. (The stability of oxygen ions in GaAs against diffusion when heated to a temperature of 600° C. has been confirmed by Secondary Ion Mass Spectrometry (SIMS) measurements.) Other medium-weight ions which would not contribute to carriers in an implantation structure may be used for implantation, such as nitrogen, fluorine, chlorine, neon, and argon. Ions heavier than argon are generally considered to be too heavy for implantation using reasonable acceleration voltages. Ions lighter than nitrogen, specifically hydrogen and helium, have a tendency to out-diffuse under elevated temperatures. The other lighter ions impact semiconductor characteristics and are not feasible to use.

Since the change in refractive index in the implanted region is caused by the implanted ions, one can control the spatial position of the affected region accurately by two well-controlled processes commonly found in integrated circuits manufacturing:

(1) Masked ion implantation. The implanted areas can be accurately defined by windows in an implantation mask on top of the wafer surface. The mask can be easily fabricated by optical lithographic techniques. This step defines which part in the plane of the wafer will receive the implanted ions.

(2) Implantation with variable energies. The implantation energy determines the depth at which the ions will mostly reside. Hence, the depth of any implanted region below the surface of the wafer is governed by the implant energy. In addition, the extent of change in refractive index is presumably determined by the amount of defects generated by the implanted ions, which in turn is governed by the ion dose.

By controlling three factors, the implant mask, the implant energy and the implant dose, one can design and fabricate waveguides of any arbitrary shape that can be located anywhere inside a three-dimensional wafer. Waveguides no longer have to be situated on the surface only. Waveguides thus fabricated can be used to make optical couplers by placing them next to one another or to make modulators by forming a Mach-Zehnder interferometric device.

By this invention, one can use an improved ion implantation process for the fabrication of optical waveguides, couplers, modulators and similar optical components that are suitable for the fabrication of photonic integrated circuits.

This invention allows fabrication of an optical waveguide, coupler, or modulator that can be located with high precision anywhere inside or on the surface of III-V-type semiconductor wafers such as GaAs, InP or their alloys (which typically consist of a mixture of Al, Ga, In, As and P).

A feature of the present invention is the provision of a high energy oxygen implantation process that can create light propagating films in various III-V semiconductor wafers such as those mentioned above.

The invention will be better understood by reference to the following detailed description in connection with the accompanying drawings.

DESCRIPTION OF SPECIFIC EMBODIMENTS

Figure 1:
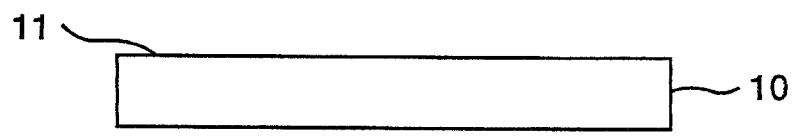
FIGS. 1 through 4 depict a fabrication process according to the invention.

Referring to FIG. 1, there is shown a stock substrate wafer 10 of a III-V material such as GaAs or a similar binary compound or heterostructure, which can have either high or low resistivity. This implies that the substrate can either be bulk melt-grown GaAs or InP or the like, or it can be a multi-layer structure grown epitaxially on bulk substrates.

The upper surface 11 of the wafer must be polished (to enhance optical and process interaction), and the entire wafer is preferably cleaned by standard processing techniques. The wafer 10 may be about 400 µm in thickness.

Figure 2:
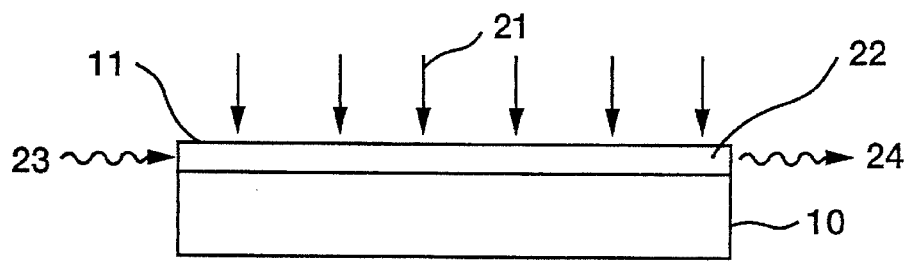

According to the invention, the wafer is placed in an ion implanter (not shown) where high-energy ions 21 of defined characteristics, typically oxygen ions 21, are allowed to impinge on the wafer surface 11 and to penetrate it to create an implanted layer 22 (FIG. 2). The depth of the leading edge of layer 22 depends on the maximum implant energy. At 3 MeV initial implantation, the leading edge of layer 22 is about 3 µm below the surface of the wafer 10.

According to the invention, the wafer 10 is subjected to multiple ion implantation steps after an initial deep implantation. Because of the nature of ion implantation, the layer 22 will not be uniform if there is only one implantation at one energy. In order to produce a uniform layer about 3 µm thick, according to the invention, multiple implantations of oxygen are carried out at the following energies and doses:

1) 3 MeV and $1 \times 10^{15}$ cm$^{-2}$ (the initial deep implantation);
2) 1.5 MeV and $1 \times 10^{15}$ cm$^{-2}$ (half-energy-level implantation);
3) 0.6 MeV and $1 \times 10^{15}$ cm$^{-2}$; (one-fifth-energy-level implantation);
4) 190 keV and $1.5 \times 10^{15}$ cm$^{-2}$ (first trimming implantation); and
5) 100 keV and $1.5 \times 10^{15}$ cm$^{-2}$ (final (optional) trimming implantation).

After this multiple-step implantation process and when the refractive index of the wafer is measured by reflectance at the wavelength of 1.3 µm, it has been found that the process increases index of refraction by as much as 0.2 above its nominal value (about 3.4).

According to the invention, thereafter a rapid thermal annealing (RTA) step is performed on the wafer 10. The RTA comprises applying broad spectrum radiant heat, preferably at 600° C. (±5° C.) for 9 seconds (±1 sec) to eliminate as much implantation-induced damage as possible. Preferably, the radiant heat is applied by a halogen lamp (broad spectrum, IR through UV).

The refractive index measured after this step shows a decrease from the initial change. For example, a net increase of 0.03 above its nominal value has been measured, which is a significant reduction from what it is before the RTA step. Nevertheless, the RTA process is important since it has been established that it removes significant amounts of damage from the wafer as a result of the preceding implantation step.

When optical measurements are thereafter performed by coupling light 23 into the implanted film in one end and collecting the exiting light 24 coming out from the other end, it can be confirmed that the film acts as a waveguide after ion implantation and annealing are performed.

Figure 3:
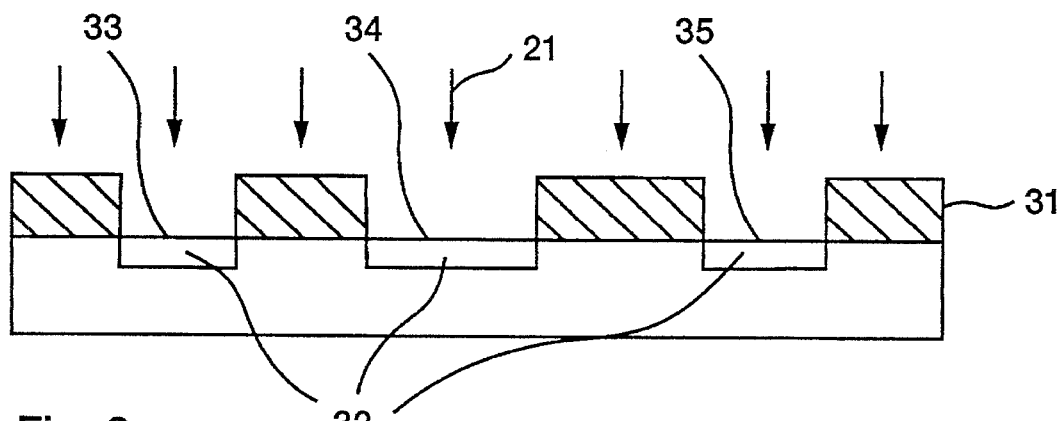

FIG. 3 illustrates the fabrication of channel waveguides. In this example, the process of implantation is preceded by the preparation of a mask. In particular, a tungsten mask 31 is prepared by sputtering and then channel regions 33–35 are defined by the etched away spaces in the mask 31. The mask 31 will allow oxygen ions 21 to be selectively implanted into the GaAs along the channel regions 33–35 forming channels 32 in the substrate where the tungsten has been removed by the chemical etching. The tungsten film 31 is preferably about 1.5 µm thick in order to stop all and in particular the most energetic oxygen ions from penetrating into the GaAs immediately below the film 31. Thereafter, oxygen ions 21 are applied to the structure. The same ion doses, steps and energies are used as before. In a specific embodiment of a waveguide centered at 1.3 µm optical wavelength the implanted channels are each about 6 µm (±0.5 µm) wide and spaced at no less than 6 µm (±0.5 µm) apart for refractive index differences achievable according to the present invention.

After implantation and RTA steps according to the invention, the remaining tungsten mask is removed by chemical etching. Otherwise, the mask will interfere with light absorption.

Figure 4:
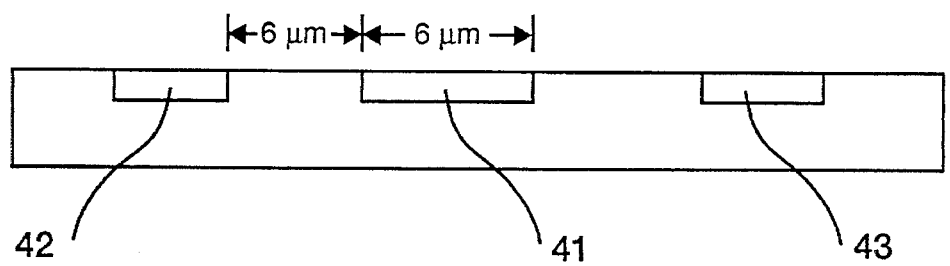

Optical measurements may be performed by sending light into only one channel and collecting all the light coming out of as many channels as the detector can take. A suitable detector is a Vidicon camera, which can image many channels at the same time to the same screen. The image may be displayed on a computer monitor and converted into digital signals for analysis. In the measurements, light is sent into a channel 41 (FIG. 4). Emerging light will be seen to come out from channels 42, 43 and others even further away, due to various effects, namely, wave coupling between adjacent channels and scattering from within the implanted channels due to residual defects not eliminated by the annealing step. Consequently an efficient coupler is produced in which light traveling in one waveguide is coupled to adjacent waveguides.

Figure 5:
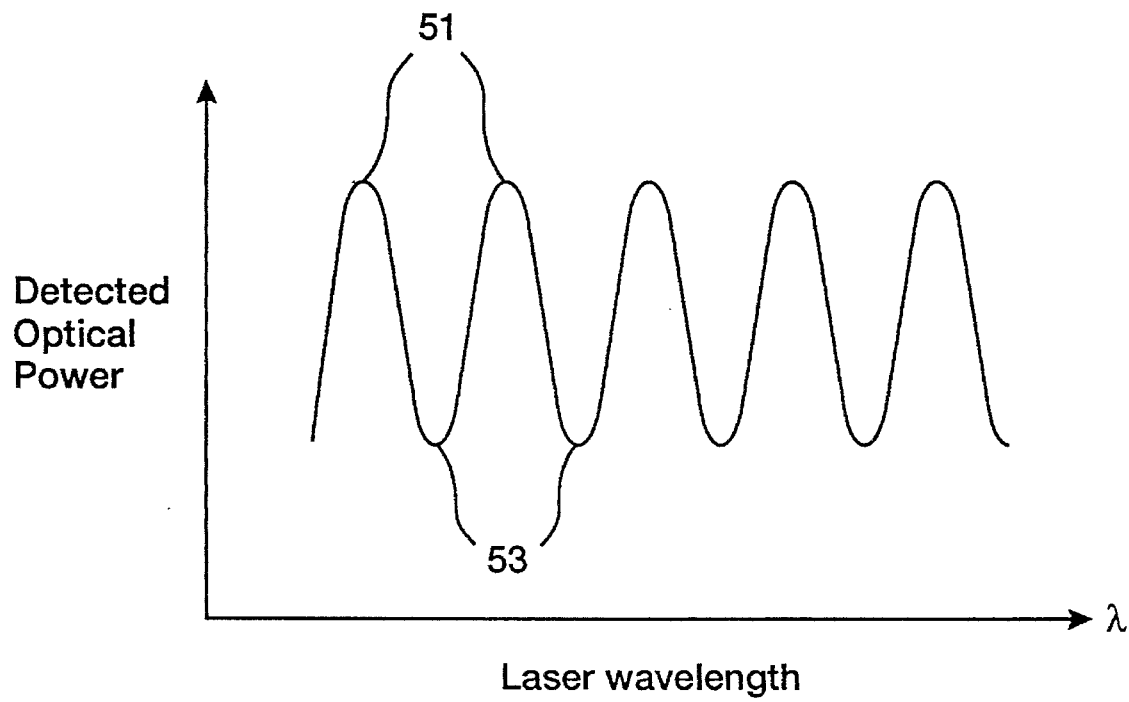
FIG. 5 is graph illustrating detected optical power vs. wavelength which is used to calculate waveguide loss.

Other measurement techniques can be used to determine the loss of a waveguide constructed according to the invention. In a measurement focused on one single waveguide only, interferometric effects can be used to determine the attenuation of the optical waveguide. A laser beam impinging on a channel waveguide is tuned over a range of wavelengths while keeping the power fixed and while light power at the exit of the waveguide is measured. The light power emerging from the opposite end of the waveguide will show maxima and minima as a function of the wavelength (FIG. 5). By analyzing the maxima and minima in a particular embodiment, the loss in the waveguide has been found to be about 10 dB/cm. The loss is by no means small, but it is expected that by further optimization of implant doses and RTA conditions it can be reduced.

Figure 6:
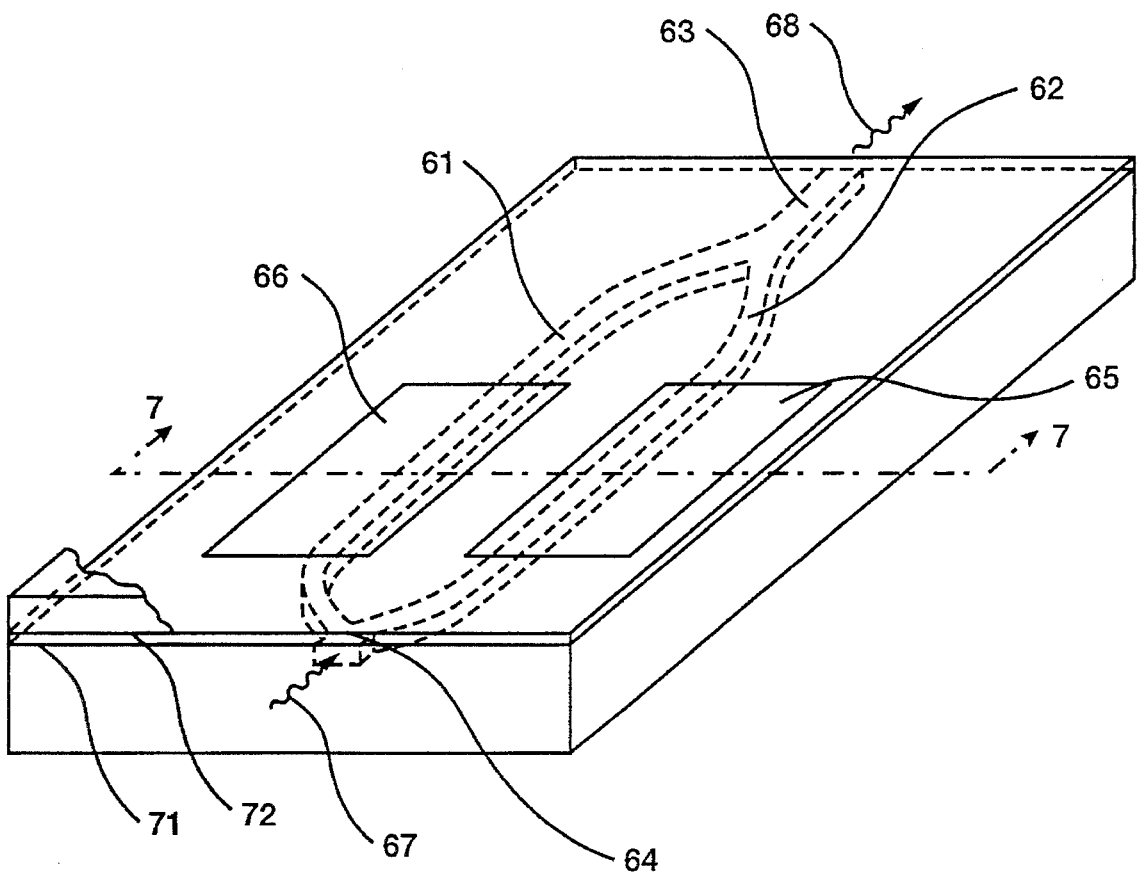
FIG. 6 is a perspective view of an optical modulator according to the invention.

The channel waveguides thus fabricated can be configured into the shape shown in FIG. 6 to form an optical modulator. Channel waveguide branches 61, 62, 63 and 64 are all formed in a single selective ion implantation step using tungsten mask as described hereinabove. Metal electrodes 65 and 66 are emplaced for example by evaporation onto the wafer surface selectively through a mask. Application of a voltage between electrodes 65 and 66 creates an audio frequency to microwave e–m field which can interact with the optical e–m fields in the waveguides to modulate the optical signal applied along path 67 and emerging along path 68.

Figure 7:
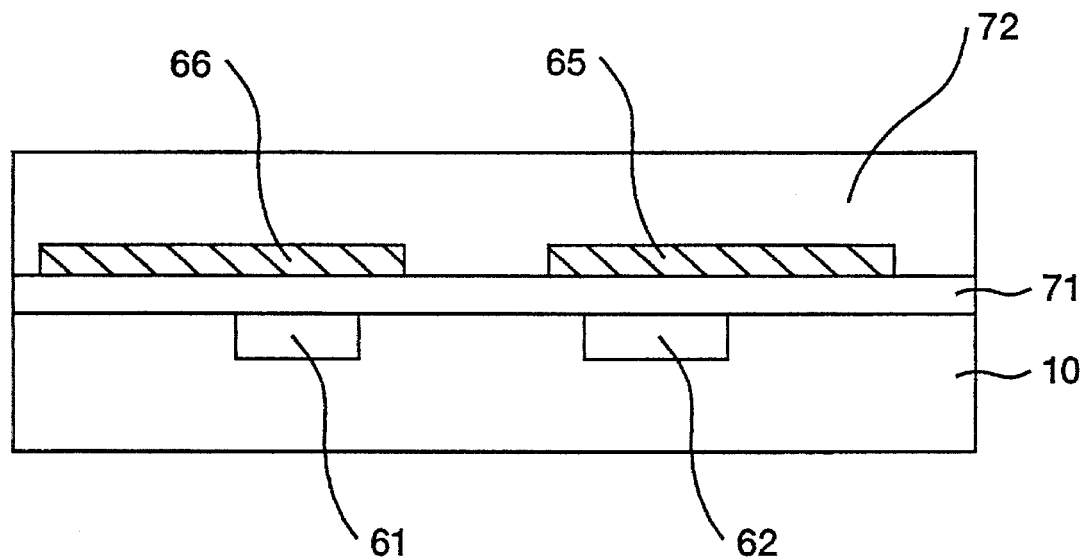
FIG. 7 is a side cross-sectional view of FIG. 6.

A cross-section of the structure along the line 7—7 is shown in FIG. 7. The waveguide branches 61 and 62 are produced identically to channels 41 and 42 shown in FIG. 4. On top of the wafer 10, a thin layer of buffer dielectric 71 may optionally be deposited by either sputtering or chemical vapor deposition. (The main purpose is to isolate the light propagating in the waveguides 61 and 62—which are implanted at an appropriate depth in the wafer 10—from making direct contact with the metal electrodes 66 and 65 above them, where the waveguides 61 and 62 are not sufficiently deeply implanted to provide adequate optical isolation from the electrodes.) The metal electrodes 65 and 66 serve to introduce a modulating voltage which can modulate the transmitted light in the waveguides 61 and 62 by means of an electro-optic effect. An additional film of dielectric 72, such as tantalum oxide, is preferably deposited over surface with the metal electrodes 65, 66. The additional film of dielectric is intended to preserve velocity matching between the modulating voltage and the transmitted light.

Other medium-weight ions which would not contribute to carriers in an implantation structure may be used for implantation, such as nitrogen, fluorine, chlorine, neon and argon. Ions heavier than argon are generally considered to be too heavy for implantation using reasonable acceleration voltages. Ions lighter than nitrogen, specifically hydrogen and helium, have a tendency to out-diffuse under elevated temperatures. The other lighter ions (lithium, beryllium, boron, and carbon) impact semiconductor characteristics in various ways (e.g., boron is a group III element which incorporates into the crystal lattice, while the other elements contribute carriers) and are therefore not feasible to use.

The invention has now been explained with reference to specific embodiments. Other embodiments will be apparent to those of ordinary skill in the art. It is therefore not intended that this invention be limited, except as indicated by the appended claims.

What is claimed is:

1. An optical waveguide comprising:

(a) a substrate of substantially III-V material; and (b) an ion-implanted region within said substrate produced by MeV ion implantation and rapid thermal annealing, said ion-implanted region exhibiting crystalline defects without additional contribution of carriers from the ions such that a higher refractive index exists than in surrounding regions, said ion-implanted region defining a waveguide path.

2. The waveguide of claim 1, wherein said substrate is a semiconductor material with substantially high resistivity.

3. The waveguide of claim 1, wherein ions employed to produce said ion-implanted region comprise oxygen ions.

4. The waveguide of claim 1, wherein ions employed to produce said ion-implanted region are selected from the group consisting of ions of the elements oxygen, nitrogen, fluorine, chlorine, neon and argon.

5. The waveguide of claim 1, wherein the III-V material is selected from the group consisting of GaAs, InP, and a mixture of Al, Ga, In, As and P, B, and N.

6. The waveguide of claim 1, wherein said semiconductor material is a III-V material with substantially high resistivity.

7. The waveguide of claim 1, wherein said substrate is a semi-insulating III-V material.

8. An optical waveguide comprising:

(a) a substrate of substantially III-V material; and (b) an ion-implanted region within aid substrate produced by MeV ion implantation and rapid thermal annealing, said ion-implanted region exhibiting crystalline defects without additional contribution of carriers from the ions such that a higher refractive index exists than in surrounding regions, said ion-implanted region defining a waveguide path, wherein said ion implantation is by means of multiple implantations, each implantation being performed at a different implantation energy.

9. An optical waveguide comprising:.

(a) a substrate of substantially III-V material; and (b) an ion-implanted region within said substrate produced by MeV ion implantation of an ion dose and rapid thermal annealing, said ion-implanted region exhibiting crystalline defects without additional contribution of carriers from the ions such that a higher refractive index exists than in surrounding regions, said ion-implanted region defining a waveguide path, wherein said implantation is by means of multiple implantations wherein the ion dose of said ion implantation is different for at least two implantations.

10. An optical coupler for a 1.3 μm wavelength optical signal comprising:

(a) a substrate of substantially III-V material; and (b) first and second channel waveguides, said first and second channel waveguides each comprising an ion-implanted region within said substrate produced by MeV ion implantation and rapid thermal annealing, said ion-implanted region exhibiting crystalline defects without additional contribution of carriers from the ions such that a higher refractive index exists than in surrounding regions, said ion-implanted region defining a waveguide path, said first channel waveguide having a least one segment spaced in parallel with a corresponding one segment of said second channel waveguide at 6 μm apart (±0.5 μm) and each said first and second channel waveguide having a width of 6 μm (±0.5 μm).

11. An optical modulator comprising:

(a) a substrate of substantially III-V material; and (b) first and second channel waveguides, said first and second channel waveguides each comprising an ion-implanted region within said substrate produced by MeV ion implantation and rapid thermal annealing, said ion-implanted region exhibiting crystalline defects without additional contribution of carriers from the ions such that a higher refractive index exists than in surrounding regions, said first and second channel waveguides being spaced apart sufficiently at an electrode region so as not to interact optically, said first and second channel waveguides being joined in a first common waveguide at an input prior to the electrode region and at a second common waveguide at an output past the electrode region; and (c) electrical contacts on the surface of said first and second channel waveguides in the electrode region for introducing a modulating voltage and thus controlling the optical modulation of light travelling in the first and second channel waveguides by means of electro-optic effect.

12. The modulator according to claim 11 further including:
- (d) a top dielectric over the electrical contacts to provide velocity matching; and
- (e) a dielectric layer immediately on top of the substrate to conductively isolate the first and second waveguide channels from the electrical contacts.

13. A method for fabricating an optical waveguide comprising:
- (a) providing a substrate of substantially III-V material; and
- (b) implanting a dose of ions within said substrate by MeV ion implantation without additional contribution of carriers to the substrate from the ions; and
- (c) annealing said substrate so implanted by rapid thermal annealing, such that said ion-implanted region exhibits crystalline defects such that a higher refractive index exists than in surrounding regions, said ion-implanted region defining a waveguide path, wherein said ion implanting step comprises multiple implantations, each at a different implantation energy.

14. A method for fabricating an optical waveguide comprising:
- (a) providing a substrate of substantially III-V material; and
- (b) implanting a dose of ions within said substrate by MeV ion implantation without additional contribution of carriers to the substrate from the ions; and
- (c) annealing said substrate so implanted by rapid thermal annealing, such that said ion-implanted region exhibits crystalline defects such that a higher refractive index exists than in surrounding regions, said ion-implanted region defining a waveguide path, wherein said ion implanting step comprises multiple implantations, the ion dose of at least two implantations being different from each other.

15. A method for fabricating an optical waveguide comprising:
- (a) providing a substrate of substantially III-V material; and
- (b) implanting a dose of ions within said substrate by MeV ion implantation without additional contribution of carriers to the substrate from the ions; and
- (c) annealing said substrate so implanted by rapid thermal annealing, such that said ion-implanted region exhibits crystalline defects such that a higher refractive index exists than in surrounding regions, said ion-implanted region defining a waveguide path.

16. The method of claim 15, wherein ions employed to produce said ion-implanted region comprise oxygen ions.

17. The method of claim 15, wherein ions employed to produce said ion-implanted region are selected from the group consisting of ions of the elements oxygen, nitrogen, fluorine, chlorine, neon and argon.

18. The method of claim 15, wherein the III-V material is selected from the group consisting of GaAs, InP, and a mixture of Al, Ga, In, As and P, B, and N.

19. The method of claim 15, wherein said rapid thermal annealing step is broadband lamp irradiation.

20. The method of claim 19, wherein said broadband lamp irradiation step is irradiation at 550° C. to 650° C. for a period of approximately fifteen seconds to five seconds.

21. The method of claim 20, wherein said broadband lamp irradiation step is halogen irradiation for a period of substantially 600° C. (±5° C.) for a period of nine seconds (±1 sec).

22. A method for fabricating an optical waveguide comprising:
- (a) providing a substrate of substantially III-V material; and
- (b) implanting a dose of ions within said substrate by MeV ion implantation without additional contribution of carriers to the substrate from the ions; and
- (c) annealing said substrate so implanted by rapid thermal annealing, such that said ion-implanted region exhibits crystalline defects such that a higher refractive index exists than in surrounding regions, said ion-implanted region defining a waveguide path, said ion implanting step comprising:
  implanting oxygen ions with energies and doses of the following magnitudes in the following order:
  1) 3 MeV and $1\times10^{15}$ cm$^{-2}$ (the initial deep implantation);
  2) 1.5 MeV and $1\times10^{15}$ cm$^{-2}$ (half-energy-level implantation);
  3) 0.6 MeV and $1\times10^{15}$ cm$^{-2}$; (one-fifth-energy-level implantation);
  4) 190 keV and $1.5\times10^{15}$ cm$^{-2}$ (first trimming implantation); and
  5) 100 keV and $1.5\times10^{15}$ cm$^{-2}$ (final trimming implantation).

* * * * *